(12) United States Patent
Tanaka (10) Patent No.: US 6,301,372 B1
(45) Date of Patent: *Oct. 9, 2001

(54) CAMERA CALIBRATION APPARATUS

(75) Inventor: Mikio Tanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/664,453

(22) Filed: Sep. 18, 2000

Related U.S. Application Data (63) Continuation of application No. 09/119,657, filed on Jul. 21, 1998.

(30) Foreign Application Priority Data

Jul. 23, 1997 (JP) .................................................. 9-196267

(51) Int. Cl.$^7$ .................................................. G06K 9/00
(52) U.S. Cl. .................................................. 382/106
(58) Field of Search .................................. 382/106, 154, 382/286, 288, 291; 348/129, 135, 140, 187, 188; 356/4.02, 6, 375, 376

(56) References Cited

U.S. PATENT DOCUMENTS

| | | | |
|---|---|---|---|
| 4,893,183 | 1/1990 | Nayar | 348/135 |
| 5,227,985 | 7/1993 | DeMenthon | 702/153 |
| 5,699,444 | 12/1997 | Palm | 382/106 |
| 5,850,469 | 12/1998 | Martin et al. | 382/154 |
| 5,917,937 | 6/1999 | Szeliski et al. | 382/154 |
| 5,991,437 | 11/1999 | Migdal et al. | 382/154 |

FOREIGN PATENT DOCUMENTS

| | | | |
|---|---|---|---|
| 1-232484 | 9/1989 | (JP) | G06F/15/70 |
| 2-51008 | 2/1990 | (JP) | G01B/11/26 |
| 2-61517 | 3/1990 | (JP) | G01C/21/24 |
| 4-54409 | 2/1992 | (JP) | G01B/11/26 |
| 6-194138 | 1/1994 | (JP) | G01B/11/24 |

Primary Examiner—Andrew W. Johns
Assistant Examiner—Shervin Nakhjavan
(74) Attorney, Agent, or Firm—McGuireWoods LLP (57) ABSTRACT

The invention provides a camera calibration apparatus which eliminates the necessity to effect mapping making a distinction among a plurality of characteristic points and can prevent complication in mapping processing even if the number of characteristic points increases. An object imaging section images a sphere whose magnitude and position in a three-dimensional coordinate system are known, and a magnitude/position detection section determines a magnitude and a position of the sphere on a screen from an image imaged by the object imaging section. A center position estimation section estimates a three-dimensional position of the center of the sphere from the magnitude and the position of the sphere on the screen determined by the magnitude/position detection section, and a parameter calculation section calculates a position of the object imaging section in the three-dimensional coordinate system based on the three-dimensional position of the center of the sphere estimated by the center position estimation section.

6 Claims, 9 Drawing Sheets

CAMERA CALIBRATION APPARATUS

This application is a continuation of U.S. patent application Ser. No. 09/119,657, filed on Jul. 21, 1998, the contents of which are incorporated herein by reference.

BACKGROUND OF THE INVENTION

1. Field of the Invention

The present invention relates to a camera calibration apparatus, and more particularly to a camera calibration apparatus which estimates the position and the direction of a camera from the positions of characteristic points of an image imaged.

2. Description of the Related Art

In a conventional camera calibration apparatus of the type mentioned, an object having three or more characteristic points (or characteristic lines) whose relative positions are known is imaged, and calibration wherein the position and the direction of the camera are estimated from the positions of the characteristic points in the thus imaged image is performed.

Conversely to the calibration described above, as an object posture estimation method, a tetrahedron arrangement estimation method which uses four or more characteristic points, a three-line segment and two-point arrangement estimation method which uses three or more line segments and two or more characteristic points, and so forth have been proposed. While any of the object posture estimation methods estimates the posture of an object, since the relationship between the camera and the object is relative, it is also possible to estimate the position or the direction of the camera using the method.

The tetrahedron arrangement estimation method is disclosed in Japanese Patent Laid-Open Application No. Heisei 1-232484, and the three-line segment and two-point arrangement estimation method is disclosed in Japanese Patent Laid-Open Application No. Heisei 2-51008.

In the conventional camera calibration described above, processing of mapping between characteristic points originating from an image and characteristic points of an original object imaged is required. In this instance, in order to raise the accuracy in calibration, it is necessary to increase the number of characteristic points. However, as the number of characteristic points increases, the mapping processing becomes less stable and more complicated.

Further, with the tetrahedron arrangement estimation method, the three-line segment and two-point estimation method and so forth as an object posture estimation method, it is difficult to stably extract four or more characteristic points (characteristic lines) depending upon imaging conditions. As a result, even if an error occurs with the mapping between characteristic points, no countermeasure to correct the error can be taken.

SUMMARY OF THE INVENTION

It is an object of the present invention to provide a camera calibration apparatus which eliminates the necessity to effect mapping making a distinction among a plurality of characteristic points and can prevent complication in mapping processing even if the number of characteristic points increases.

In order to attain the object described above, according to an aspect of the present invention, there is provided a camera calibration apparatus, comprising object imaging means for imaging a sphere whose magnitude and position in a three-dimensional coordinate system are known, magnitude/position detection means for determining a magnitude and a position of the sphere on a screen from an image imaged by the object imaging means, center position estimation means for estimating a three-dimensional position of the center of the sphere from the magnitude and the position of the sphere on the screen determined by the magnitude/position detection means, and means for calculating a position of the object imaging means in the three-dimensional coordinate system based on the three-dimensional position of the center of the sphere estimated by the center position estimation means.

In the camera calibration apparatus, a sphere whose magnitude and position in a three-dimensional coordinate system are known is imaged, and from the thus imaged image, the magnitude and the position of the sphere on the screen are determined. Then, from the magnitude and the position of the sphere on the screen thus determined, the three-dimensional position of the center of the sphere is estimated, and the position of the camera in the three-dimensional coordinate system is calculated based on the thus estimated three-dimensional position of the center of the sphere. Consequently, the camera calibration apparatus is advantageous in that the necessity to perform mapping of a plurality of characteristic points making a distinction among them can be eliminated and complication of mapping processing can be prevented even if the number of characteristic points is increased.

The camera calibration apparatus may further comprise zenith detection means for determining a position of the zenith of the sphere on the screen from the image imaged by the object imaging means, zenith position estimation means for estimating a three-dimensional position of the zenith from the position of the zenith on the screen determined by the zenith detection means and the three dimensional position of the center of the sphere, and means for calculating a direction of the object imaging means in the three-dimensional coordinate system based on the three-dimensional position of the zenith estimated by the zenith position estimation means and the three-dimensional position of the center of the sphere estimated by the center position estimation means.

As an alternative, the camera calibration apparatus may further comprise equator characteristic point detection means for determining a position of a characteristic point on the equator of the sphere on the screen from the image imaged by the object imaging means, orthogonal vector calculation means for determining, from the position of the characteristic point on the equator determined by the equator characteristic point detection means and the three-dimensional position of the center of the sphere, a line segment orthogonal to a straight line interconnecting the characteristic point on the equator and the center of the sphere, and means for calculating a direction of the object imaging means in the three-dimensional coordinate system based on the three-dimensional position of the zenith estimated based on the line segment determined by the orthogonal vector calculation means and the three-dimensional position of the center of the sphere estimated by the center position estimation means.

In each of the camera calibration apparatus which comprises the additional elements described above, the position of a characteristic point at the zenith or on the equator of a sphere on the screen is determined from an imaged image, and from the thus determined position of the characteristic at the zenith or on the equator on the screen and the three-dimensional position of the center of the sphere, a line segment orthogonal to a straight line interconnecting the three-dimensional position of the zenith or the characteristic point on the equator and the center of the sphere is estimated. Then, based on the thus estimated line segment orthogonal to the straight line interconnecting the three-dimensional position of the zenith or the characteristic point on the equator and the center of the sphere and the three-dimensional position of the center of the sphere, the position and the direction of the camera in the three-dimensional coordinate system are calculated. Consequently, the camera calibration apparatus is advantageous in that the necessity to perform mapping of a plurality of characteristic points making a distinction among them can be eliminated and complication of mapping processing can be prevented even if the number of characteristic points is increased.

Alternatively, the camera calibration apparatus may further comprise equator characteristic point detection means for determining positions of a plurality of characteristic points on the equator of the sphere on the screen from the image imaged by the object imaging means, equator plane calculation means for determining an equator plane of the equator from the positions of the plurality of characteristic points on the equator determined by the equator characteristic point detection means and the three-dimensional position of the center of the sphere, and means for calculating a direction of the object imaging means in the three-dimensional coordinate system based on the three-dimensional position of the zenith estimated based on the equator plane determined by the equator plane calculation means and the three-dimensional position of the center of the sphere estimated by the center position estimation means.

According to another aspect of the present invention, there is provided a camera calibration apparatus, comprising object imaging means for imaging a plurality of spheres whose magnitudes and positions in a three-dimensional coordinate system are known, magnitude/position detection means for determining magnitudes and positions of the plurality of spheres on a screen from an image imaged by the object imaging means, center position estimation means for estimating three-dimensional positions of the centers of the plurality of spheres from the magnitudes and the positions of the plurality of spheres on the screen determined by the magnitude/position detection means, and means for calculating a position and a direction of the object imaging means in the three-dimensional coordinate system based on the three-dimensional positions of the centers of the plurality of spheres estimated by the center position estimation means.

In the camera calibration apparatus, a plurality of spheres whose magnitudes and positions in a three-dimensional coordinate system are known are imaged, and from a thus imaged image, magnitudes and positions of the plurality of spheres on the screen are determined. Then, from the magnitudes and the positions of the plurality of spheres on the screen thus determined, three-dimensional positions of the centers of the plurality of spheres are estimated, and based on the three-dimensional positions of the centers of the plurality of spheres estimated, a position and a direction of the object imaging means in the three-dimensional coordinate system are calculated. Consequently, the camera calibration apparatus is advantageous in that the necessity to perform mapping of a plurality of characteristic points making a distinction among them can be eliminated and complication of mapping processing can be prevented even if the number of characteristic points is increased.

The above and other objects, features and advantages of the present invention will become apparent from the following description and the appended claims, taken in conjunction with the accompanying drawings in which like parts or elements are denoted by like reference symbols.

DESCRIPTION OF THE PREFERRED EMBODIMENTS

Figure 1:
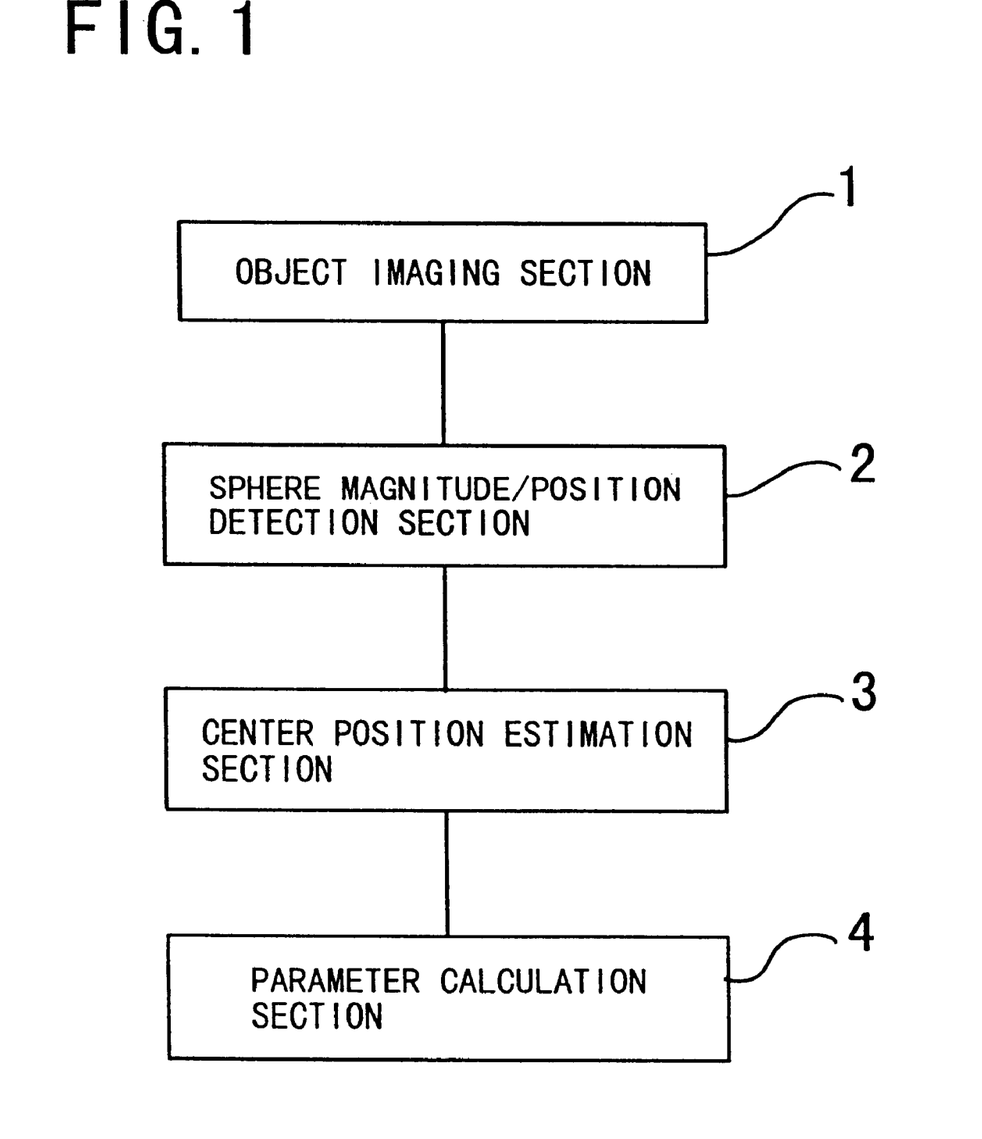
FIG. 1 is a block diagram showing a construction of a camera calibration apparatus to which the present invention is applied.

Referring first to FIG. 1, there is shown in block diagram a construction of a camera calibration apparatus to which the present invention is applied. The camera calibration apparatus shown includes an object imaging section 1, a sphere-magnitude/position detection section (hereinafter referred to merely as detection section) 2, a center position estimation section 3, and a parameter calculation section 4.

The object imaging section 1 images a sphere not shown. Here, the magnitude and the position of the sphere are known, and the sphere is placed in a three-dimensional coordinate system (hereinafter referred to as world coordinate system) set in advance. The detection section 2 detects the top end, the bottom end, the left end and the right end of an image of the sphere on a screen imaged by the object imaging section 1 to determine the magnitude and the position of the sphere.

The center position estimation section 3 estimates the position of the center of the sphere in the camera coordinate system from the magnitude and the position of the sphere determined by the detection section 2. The parameter calculation section 4 determines the position of the camera in the world coordinate system from the position of the center of the sphere in the camera coordinate system estimated by the center position estimation section 3.

Referring now to FIGS. 1 to 4, in the camera calibration apparatus described above, estimation of the three-dimensional position of a camera 6 in the world coordinate system a is performed. First, a sphere 5 is imaged by the object imaging section 1 (refer to FIG. 2). It is to be noted that such a countermeasure as to color a support for the sphere 5 with a same color as that of the background is taken so that the support may not be detected as part of the sphere 5.

Figure 2:
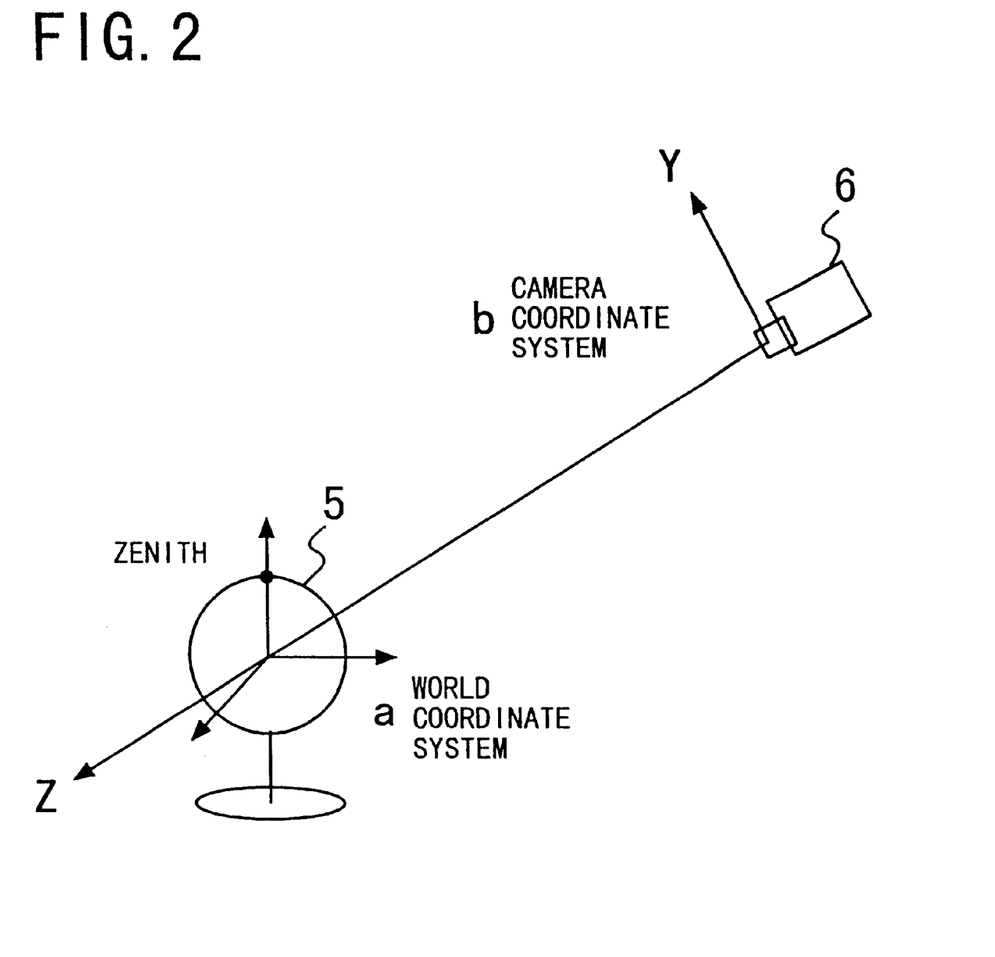
FIG. 2 is a diagrammatic view illustrating operation of an object imaging section of the camera calibration apparatus of FIG. 1.

It is assumed here that the magnitude and the position of the sphere 5 to be imaged in the world coordinate system a are known. Also it is assumed that internal parameters of the camera 6 used for imaging such as the focal length, the lens distortion, the image center and the size of the imaging plane are all known.

The detection section 2 detects the top end, the bottom end, the left end and the right end of an image 5a of the sphere 5 on a camera screen 6a imaged by the camera 6 and determines the magnitude and the position of the image 5a of the sphere 5 on the camera screen 6a.

The center position estimation section 3 estimates the position of the center of the sphere 5 in a camera coordinate system b from the magnitude and the position of the image 5a of the sphere 5 on the camera screen 6a determined by the detection section 2.

The estimation of the position of the center of the sphere 5 by the center position estimation section 3 is performed in the following manner. In the following description, all the coordinate system applied is the camera coordinate system XYZ (refer to FIG. 4). The radius of the sphere 5 in the camera coordinate system b is represented by R, the coordinates of the center are represented by $(X_0, Y_0, Z_0)$, and the coordinates of the zenith are represented by $(X_1, Y_1, Z_1)$. Further, the imaging plane L of the camera 6 is represented by Z=f (f is the focal length of the camera lens).

A plane which passes the origin 0 and extends perpendicularly to the XZ plane and besides is tangential with the sphere 5 can be represented by X+kZ=0. It is to be noted that, since the distance between the plane and the center of the sphere 5 is equal to the radius R, $$k=\{X_0 \times Z_0 \pm R[(X_0)^2+(Z_0)^2-R^2]^{1/2}\}/[R^2-(Z_0)^2]$$

Here, it is assumed that $$k'=\{X_0 \times Z_0 + R[(X_0)^2+(Z_0)^2-R^2]^{1/2}\}/[R^2-(Z_0)^2] \quad (1)$$

$$k''=\{X_0 \times Z_0 - R[(X_0)^2+(Z_0)^2-R^2]^{1/2}\}/[R^2-(Z_0)^2] \quad (2)$$

Figure 3:
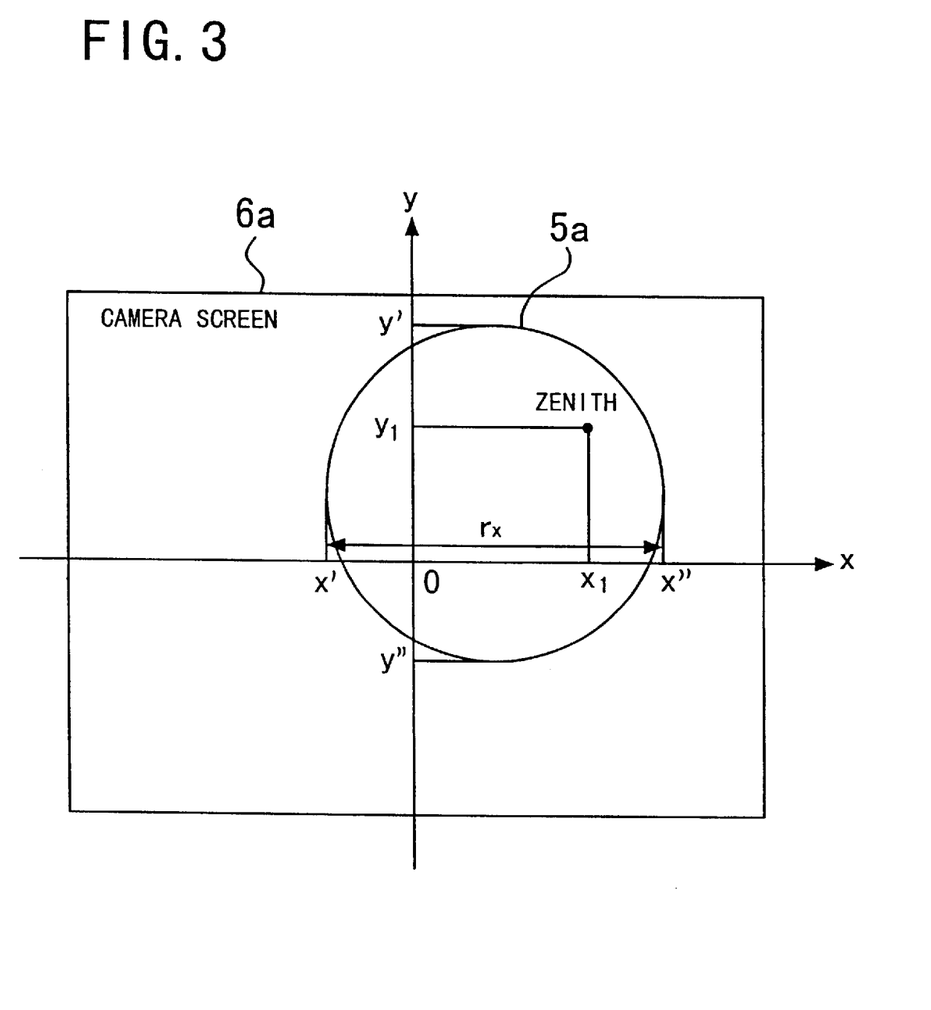
FIG. 3 is a diagrammatic view illustrating operation of a center position estimation section of the camera calibration apparatus of FIG. 1.
Figure 4:
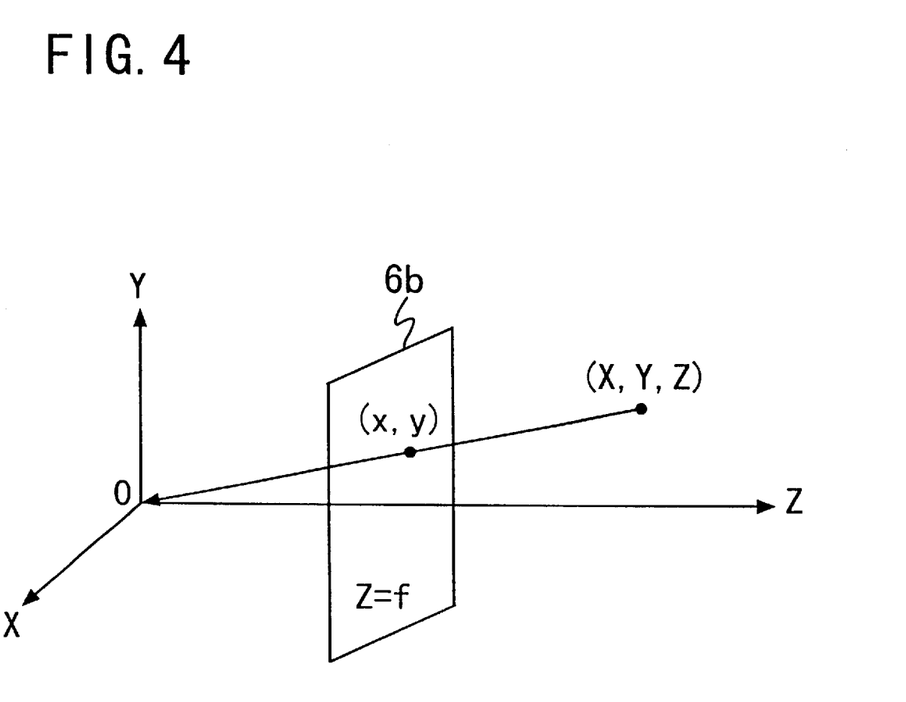
FIG. 4 is a diagrammatic view illustrating a camera coordinate system employed in the camera calibration apparatus of FIG. 1.

If, as shown in FIG. 3, an xy coordinate system whose origin is given by the center of the lens is set on the camera screen 6a and the x coordinates of the intersecting points of tangential points between tangential planes and the sphere 5 on the camera screen 6a are represented by x' and x" and besides it is assumed that $r_x = x'' - x'$, then $$r_x = x'' - x'$$
$$= f(k' - k'')$$
$$= \{2fR[(X_0)^2 + (Z_0)^2 + R^2]^{1/2}\}/[R^2 - (Z_0)^2]$$

Here, since $X_0$ is sufficiently smaller than $Z_0$, it can be considered that $(X_0/Z_0)^2=0$. Consequently, $$r_x = 2fR\{[(X_0)^2/(Z_0)^2 + 1 - R^2/(Z_0)^2]^{1/2}\}/[R^2/Z_0 - Z_0]$$
$$= 2fR\{[1 - R^2/(Z_0)^2]^{1/2}\}/\{-Z_0[1 - R^2/(Z_0)^2]\}$$
$$= -2fR/[(Z_0)^2 - R^2]^{1/2}$$

Consequently, $$(r_x)^2[(Z_0)^2-R^2]=4f^2R^2$$

Thus, if this is solved with regard to $Z_0$, then $$(Z_0)^2=[4f^2R^2+(r_x)^2R^2]/(r_x)^2$$

$$Z_0=\{R[4f^2+(r_x)^2]^{1/2}\}/r_x$$

is obtained.

$X_0, Y_0$ can be determined in the following manner. From the expressions (1) and (2) above, $$x' + x'' = -f(k' + k'')$$
$$= -f\{(2X_0Z_0)/[R^2 - (Z_0)^2]\}$$

is obtained. Consequently, $$X_0=(x'+x'')[(Z_0)^2-R^2]/2fZ_0$$

Also $Y_0$ can be determined similarly as $$Y_0=(y'+y'')[(Z_0)^2-R^2]/2fZ_0$$

If the position of the center of the sphere 5 in the camera coordinate system b is determined, then the position of the camera 6 in the world coordinate system a can be determined. However, unless components of rotation are known, transform between the world coordinate system a and the camera coordinate system b cannot be performed, and therefore, it is assumed here that the camera 6 exhibits no rotation.

In this instance, the parameter calculation section 4 can determine the position of the camera 6 in the world coordinate system a as $(-X_0-X_c, -Y_0-Y_c, -Z_0-Z_c)$ if the position of the center of the sphere 5 in the world coordinate system a is $(X_c, Y_c, Z_c)$.

Figure 5:
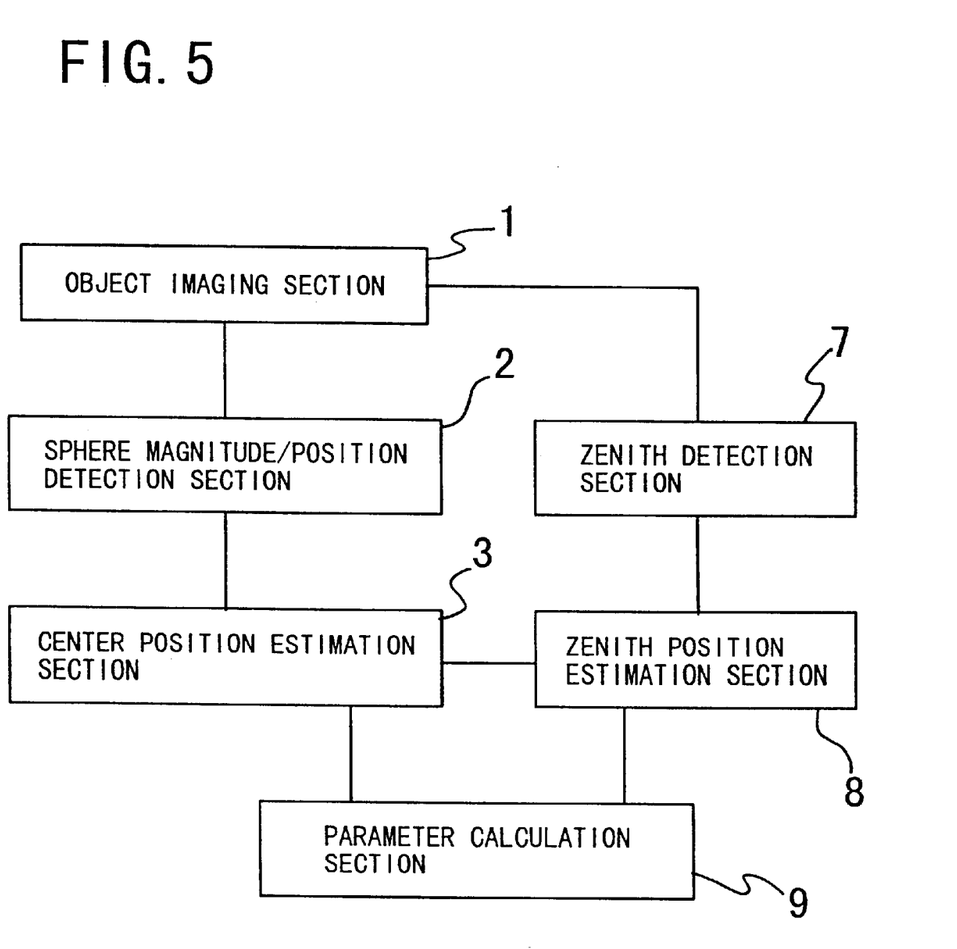
FIG. 5 is a block diagram showing a construction of another camera calibration apparatus to which the present invention is applied.

FIG. 5 shows in block diagram another camera calibration apparatus to which the present invention is applied. Referring to FIG. 5, the camera calibration apparatus is a modification to and different from the camera calibration apparatus described hereinabove with reference to FIG. 1 in that it includes a parameter calculation section 9 in place of the parameter calculation section 4 and additionally includes a zenith detection section 7 and a zenith position estimation section 8.

In the camera calibration apparatus of FIG. 5, the object imaging section 1 images a sphere which has a characteristic point at the zenith thereof, and from the thus imaged image, estimation of rotation of the camera 6 is performed in addition to estimation of the position of the camera 6.

In the camera calibration apparatus, the zenith detection section 7 detects the position of the zenith of the sphere 5 of the image imaged by the object imaging section 1. Using the position of the zenith detected in this manner and the position of the center of the sphere 5 determined by the center position estimation section 3, the zenith position estimation section 8 estimates the position of the zenith of the sphere 5 in the camera coordinate system b.

The estimation of the position of the zenith of the sphere 5 is performed in the following manner. First, the coordinates of the zenith of the sphere 5 are represented by $(X_1, Y_1, Z_1)$, and the coordinates of the zenith on the camera screen 6a are represented by $(x_1, y_1, z_1)$ (refer to FIG. 3).

Since the point $(X_1, Y_1, Z_1)$ is a point on the sphere 5, the equation of the sphere 5 is satisfied. Consequently, $$(X_1-X_0)^2+(Y_1-Y_0)^2+(Z_1-Z_0)^2=R^2$$

Since $x_1=fX_1/Z_1$ and $y_1=fY_1/Z_1$, by substituting them into the expression above, $[(x_1Z_1/f)-X_0]^2+[(y_1Z_1/f)-Y_0]^2+(Z_1-Z_0)^2=R^2$ is obtained.

By solving this with regard to $Z_1$, $Z_1=f\cdot\{(x_1X_0+y_1Y_0+fZ_0+D^{1/2})/[(x_1)^2+(y_1)^2+f^2]\}$ is obtained, where $$D = R^2[(x_1)^2 + (y_1)^2 + f^2] -$$
$$(x_1Y_0 - y_1X_0)^2 -$$
$$(fX_0 - x_1Z_0)^2 -$$
$$(fY_0 - y_1Z_0)^2$$

Further, since $X_1=x_1Z_1/f$ and $Y_1=y_1Z_1/f$, also $X_1$ and $Y_1$ can be determined immediately in a similar manner as described above.

Since the inclination of the sphere 5 in the camera coordinate system b can be determined from the position of the center and the position of the zenith of the sphere 5, parameters of the position and the direction of the camera 6 in the world coordinate system a can be determined in the following manner by the parameter calculation section 9.

Where a rotation around the X axis is represented by $\phi$ and a rotation around the Z axis is represented by $\psi$, $X_1=R\cos\phi\sin\psi+X_0$ $Y_1=R\cos\phi\cos\psi+Y_0$ $Z_1=R\sin\phi+Z_0$ and accordingly, $\phi=\sin^{-1}[(Z_1-Z_0)/R]$ $\psi=\sin^{-1}[(X_1-Z_0)/R\cos\phi]$ Once $\phi$ and $\psi$ are determined, a matrix representing a rotation of the camera 6 can be represented by $$\begin{pmatrix} 1 & 0 & 0 \\ 0 & \cos\phi & -\sin\phi \\ 0 & \sin\phi & \cos\phi \end{pmatrix} \begin{pmatrix} \cos\psi & -\sin\psi & 0 \\ \sin\psi & \cos\psi & 0 \\ 0 & 0 & 1 \end{pmatrix} = \begin{pmatrix} \cos\psi & -\sin\psi & 0 \\ \cos\phi\cdot\sin\psi & \cos\phi\cdot\cos\psi & -\sin\phi \\ \sin\phi\cdot\sin\psi & \sin\phi\cdot\cos\psi & \cos\phi \end{pmatrix}$$

Once the rotation matrix is determined, the position of the camera 6 in the world coordinate system a can be determined by $$\begin{pmatrix} \cos\psi & -\sin\psi & 0 \\ \cos\phi\cdot\sin\psi & \cos\phi\cdot\cos\psi & -\sin\phi \\ \sin\phi\cdot\sin\psi & \sin\phi\cdot\cos\psi & \cos\phi \end{pmatrix} \begin{pmatrix} -X_0 \\ -Y_0 \\ -Z_0 \end{pmatrix} = \begin{pmatrix} X_C \\ Y_C \\ Z_C \end{pmatrix}$$

where ($X_c$, $Y_c$, $Z_c$) represent the position of the center of the sphere 5 in the world coordinate system a.

Figure 6:
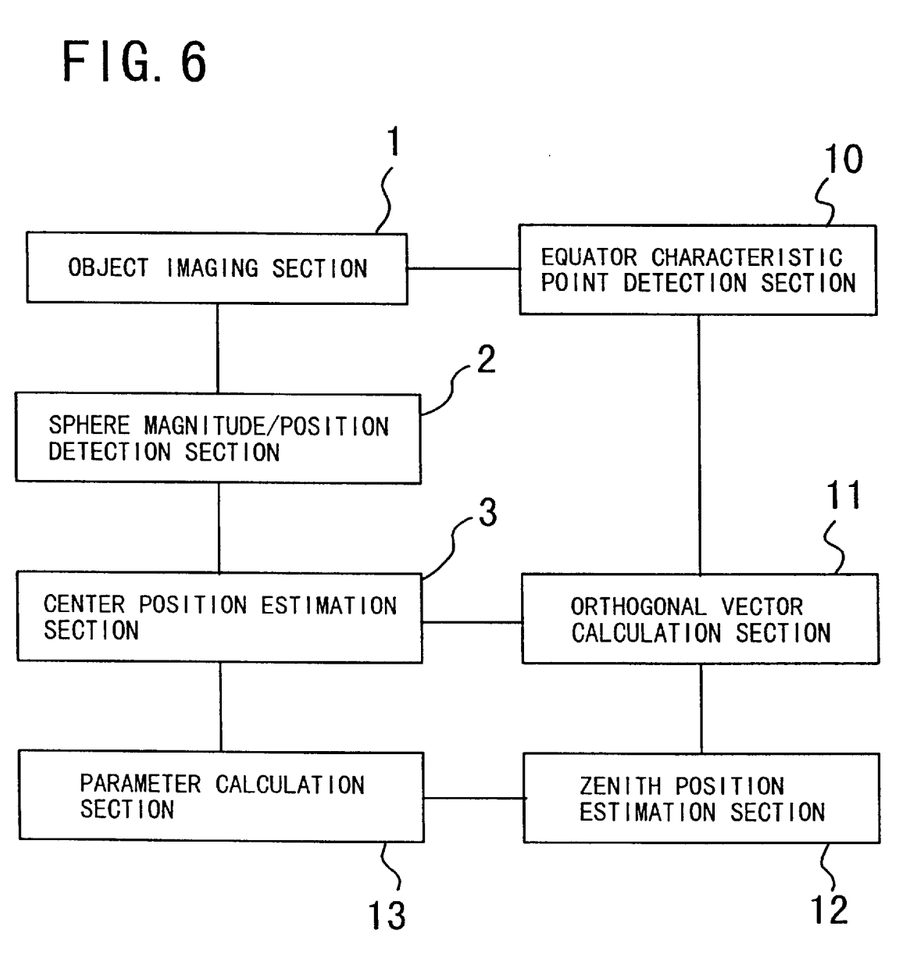
FIG. 6 is a block diagram showing a construction of a further camera calibration apparatus to which the present invention is applied.

FIG. 6 shows in block diagram a construction of a further camera calibration apparatus to which the present invention is applied. Referring to FIG. 6, the camera calibration apparatus is a modification to and different from the camera calibration apparatus described hereinabove with reference to FIG. 1 in that it includes a parameter calculation section 13 in place of the parameter calculation section 4 and additionally includes an equator characteristic point detection section 10, an orthogonal vector calculation section 11 and a zenith position estimation section 12.

In the camera calibration apparatus of FIG. 6, the object imaging section 1 images a sphere 5 which has two characteristic points on the equator thereof, and from the imaged image, estimation of rotation of a camera 6 is performed in addition to estimation of the position of the camera 6.

The equator characteristic point detection section 10 detects the two characteristic points located on the equator of the sphere 5 and determines the positions of the characteristic points on a camera screen 6a. It is to be noted that, although the two characteristic points need not be distinguished from each other, for the convenience of description, the characteristic points are denoted by M and N and the coordinates of them are represented as M=($X_2$, $Y_2$, $Z_2$) and N=($X_3$, $Y_3$, $Z_3$), respectively. Further, the coordinates of them on the camera screen 6a determined by the equator characteristic point detection section 10 are represented as ($x_2$, $y_2$) and ($x_3$, $y_3$), respectively.

Where the center of the sphere 5 is represented by C and the zenith is represented by T, the vector CT is a vector which is orthogonal to both of the vectors CM and CN and can be determined in the following matter. First, the three-dimensional coordinates of the characteristic points M and N can be determined by a quite same method as that by the zenith detection section 7 described hereinabove.

In particular, for the characteristic point M, the coordinate $Z_2$ can be determined from $Z_2=f\cdot\{(x_2X_0+y_2Y_0+fZ_0+(D_2)^{1/2})/[(x_2)^2+(y_2)^2+f^2]\}$ (4)

where $$D_2 = R^2[(x_2)^2 + (y_2)^2 + f^2] -$$
$$(x_2Y_0 - y_2X_0)^2 -$$
$$(fX_0 - x_2Z_0)^2 -$$
$$(fY_0 - y_2Z_0)^2$$

Meanwhile, for the characteristic point N, the coordinate $Z_3$ can be determined from $Z_3=f\cdot\{(x_3X_0+y_3Y_0+fZ_0+(D_3)^{1/2})/[(x_3)^2+(y_3)^2+f^2]\}$ (5)

where $$D_3 = R^2[(x_3)^2 + (y_3)^3 + f^2] - (x_3Y_0 - y_3X_0)^2 -$$
$$(fX_0 - x_3Z_0)^2 - (fY_0 - y_3Z_0)^2$$

Further, since $X_2=x_2Z_2/f$, $Y_2=y_2Z_2/f$, $X_3=x_3Z_3/f$ and $Y_3=y_3Z_3/f$, also the coordinates $X_2$, $Y_2$, $X_3$ and $Y_3$ can be determined immediately in a similar manner as described above.

Where the zenith is represented by ($X_1$, $Y_1$, $Z_1$), since the vector CT is orthogonal to both of the vectors CM and CN, $(X_1 - X_0)(X_2 - X_0) + (Y_1 - Y_0)(Y_2 - Y_0) + (Z_1 - Z_0)(Z_2 - Z_0) = 0$ (6)

$(X_1 - X_0)(X_3 - X_0) + (Y_1 - Y_0)(Y_3 - Y_0) + (Z_1 - Z_0)(Z_3 - Z_0) = 0$ (7)

Further, since the zenith T is a point on the sphere 5, $(X_1-X_0)^2+(Y_1-Y_0)^2+(Z_1-Z_0)^2=R^2$ (8)

and from the expression (6) above, $$(Z_1 - Z_0) = -\{[(X_1 - X_0)(X_2 - X_0) + (Y_1 - Y_0)(Y_2 - Y_0)]/(Z_2 - Z_0)\} \quad (9)$$

By substituting the expression (9) into the expression (7), $$Y_1 - Y_0 = \{[(Z_2 - Z_0)(X_3 - X_0) - (Z_3 - Z_0)(X_2 - X_0)]/$$
$$[(Z_3 - Z_0)(Y_2 - Y_0) - (Z_2 - Z_0)(Y_3 - Y_0)]\}(X_1 - X_0)$$

Here, if it is placed that $$W = [(Z_2 - Z_0)(X_3 - X_0) - (Z_3 - Z_0)(X_2 - X_0)]/$$
$$[(Z_3 - Z_0)(Y_2 - Y_0) - (Z_2 - Z_0)(Y_3 - Y_0)]$$

then, $$Y_1 - Y_0 = W(X_1 - X_0) \quad (10)$$

is obtained. Thus, by substituting the expressions (9) and (10) into the expression (8) and arranging them, $$(1 + W^2)(X_1 - X_0)^2 +$$
$$\{[(X_1 - X_0)(X_2 - X_0) + W(X_1 - X_0)(Y_2 - Y_0)]/(Z_2 - X_0)\}^2 = R^2$$
$$(1 + W^2)(X_1 - X_0)^2(Z_2 - X_0)^2 + (X_1 - X_0)^2[(X_2 - X_0) + W(Y_2 - Y_0)]^2 =$$
$$(R^2(Z_2 - X_0))^2$$
$$(X_1 - X_0)^2\left[(1 + W^2)(Z_2 - X_0)^2 + (X_2 - X_0)^2 + 2W(X_2 - X_0)(Y_2 - Y_0) + (W^2(Y_2 - Y_0))^2\right] - (R^2(Z_2 - X_0))^2 = 0$$

is obtained.

Since this expression is a quadratic equation of $X_1 - X_0$, $X_1 - X_0$ can be determined by solving the expression. Further, $Y_1 - Y_0$ and $Z_1 - Z_0$ can be determined successively from the expressions (9) and (10).

Since the position $(X_0, Y_0, Z_0)$ of the center of the sphere 5 has been determined by the center position estimation section 3, the zenith position estimation section 8 can estimate the position $(X_1, Y_1, Z_1)$ of the zenith.

Figure 7:
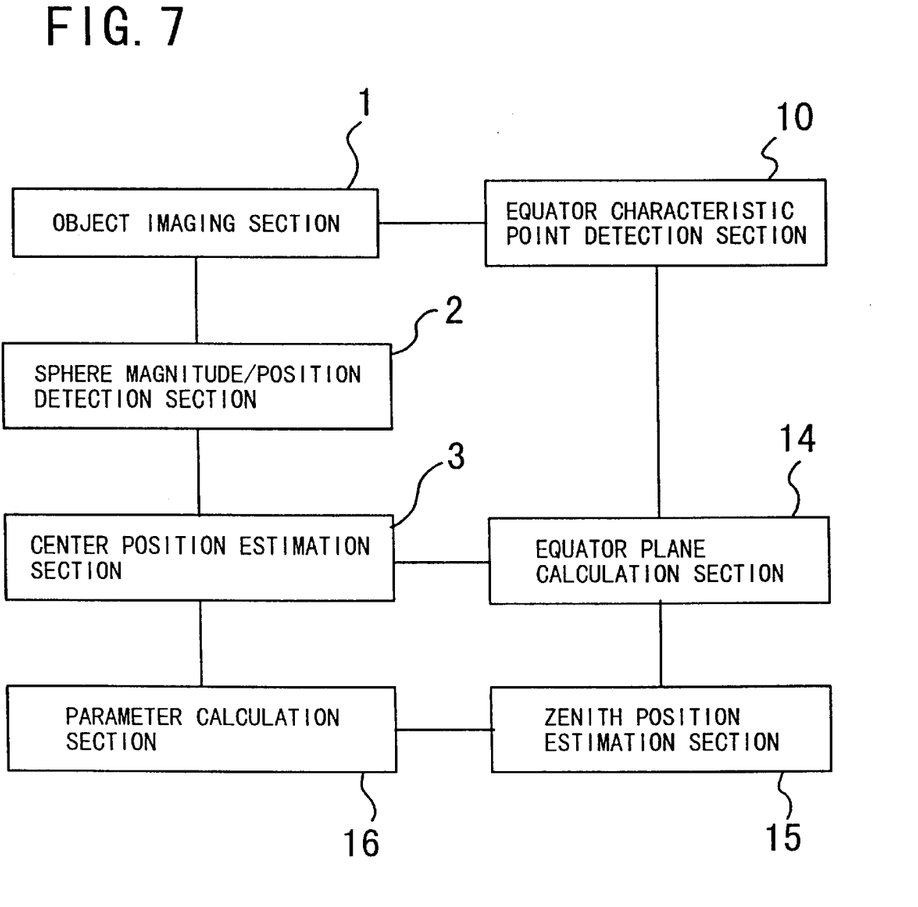
FIG. 7 is a block diagram showing a construction of a still further camera calibration apparatus to which the present invention is applied.

FIG. 7 shows in block diagram a construction of a still further camera calibration apparatus to which the present invention is applied. Referring to FIG. 7, the camera calibration apparatus is a modification to and different from the camera calibration apparatus described hereinabove with reference to FIG. 6 in that it includes a parameter calculation section 16 in place of the parameter calculation section 13 and additionally includes an equator plane calculation section 14 and a zenith position estimation section 15.

In the camera calibration apparatus of FIG. 7, the object imaging section 1 images a sphere 5 having a plurality of characteristic points on the equator thereof, and from the imaged image, estimation of rotation of the camera 6 is performed in addition to estimation of the position of the camera 6.

The equator plane calculation section 14 determines an equation of an equator plane of the sphere 5 in such a manner as described below by a least square method using the characteristic points determined by the equator characteristic point detection section 10. In this instance, where the number of characteristic points detected is n, the three-dimensional coordinates of them are represented by $(X_{01}, Y_{01}, Z_{01})$, $(X_{02}, Y_{02}, Z_{02})$, ..., $(X_{On}, Y_{On}, Z_{On})$, and the coordinates of them on the camera screen 6a are represented by $(x_{01}, y_{01})$, $(x_{02}, y_{02})$, ..., $(x_{On}, y_{On})$, respectively.

The positions $(X_{Oi}, Y_{Oi}, Z_{Oi})$ of the characteristic points can be determined in a manner quite similar as in estimation of the position of the zenith. In particular, $$Z_{0i} = f \cdot \{(x_{0i}X_0 + y_{0i}Y_0 + fZ_0 + (D_i)^{1/2})/[(x_{0i})^2 + (y_{0i})^2 + f^2]\}$$

$$X_{0i} = x_{0i}Z_{0i}/f$$

$$Y_{0i} = y_{0i}Z_{0i}/f$$

where $$D_i = R^2[(x_{0i})^2 + (y_{0i})^2 + f^2] - (x_{0i}Y_0 - y_{0i}X_0)^2 -$$
$$= (fX_0 - x_{0i}Z_0)^2 - (fY_0 - y_{0i}Z_0)^2$$

Once the three-dimensional coordinates of the characteristic points are determined, the equator plane can be determined in such a manner as described below by a minimum square method. It is examined that, when n coordinates $(X_{Oi}, Y_{Oi}, Z_{Oi})$ (i=1, ..., n) on the equator are obtained, an equation of the equator plane is placed as $Z=aX+bY+c$, and the coefficients a, b and c in the equation are estimated. Since the characteristic points are positioned on the equator plane, the estimated value $Zy_{Oi}$ of the coordinate $Z_{Oi}$ is given by $Zy_{Oi} = aX_{Oi} + bY_{Oi} + c$.

The coefficients a, b and c of the equation above are determined so that the sum S of the squares of the differences between the actual measurement values $Z_{Oi}$ and the estimated values $Zy_{Oi}$ may be minimized. Here, the sum S of the squares of the differences between the actual measurement values $Z_{Oi}$ and the estimated values $Zy_{O1}$ is represented by $$S = \sum_{i=1}^{n}(Z_{0i} - Zy_{0i})^2$$

$$= \sum_{i=1}^{n}[Z_{0i} - (aX_{0i} + bY_{0i} + c)]^2$$

In order to determine the coefficients a, b and c which minimize the square sum S, the simultaneous equations $$\bar{Z} = a\bar{X} + b\bar{Y} + c$$

$$\sigma_{XZ} = a(\sigma_X)^2 + b\sigma_{XY}$$

$$\sigma_{YZ} = a\sigma_{XY} + b(\sigma_Y)^2$$

should be solved.
where the average X, the variance $(\sigma_X)^2$ and the covariance $\sigma_{XY}$ are given respectively by $$\bar{X} = (1/n) \cdot \Sigma_{i=1}^{n} X_{0i}$$

$$(\sigma_X)^2 = (1/n) \cdot \Sigma_{i=1}^{n}(X_{0i} - \bar{X})^2$$

$$\sigma_{XY} = (1/n) \cdot \Sigma_{i=1}^{n}(X_{0i} - \bar{X})(Y_{0i} - \bar{Y})$$

Solving the equations above, $$a = [\sigma_{XZ}(\sigma_Y)^2 - \sigma_{XY}\sigma_{YZ}]/[(\sigma_X)^2(\sigma_Y)^2 - (\sigma_{XY})^2]$$

$$b = [\sigma_{YZ}(\sigma_X)^2 - \sigma_{XY}\sigma_{XZ}]/[(\sigma_X)^2(\sigma_Y)^2 - (\sigma_{XY})^2]$$

$$c = \bar{Z} - a\bar{X} - b\bar{Y}$$

are obtained. Consequently, the equation $Z=aX+bY+c$ is determined.

Since the position $(X_0, Y_0, Z_0)$ of the center is estimated by the center position estimation section 3 and the direction vector $(a, b, -1)$ of the axis of rotation is estimated by the equator plane calculation section 14, the position $(X_1, Y_1, Z_1)$ of the zenith can be determined in the following manner by the zenith position estimation section 15.

In particular, when $$t = R(a^2 + b^2 + 1)^{1/2}$$

the following expression is obtained $$(X_1, Y_1, Z_1) = (X_0, Y_0, Z_0) + (a, b, -1)t$$

Figure 8:
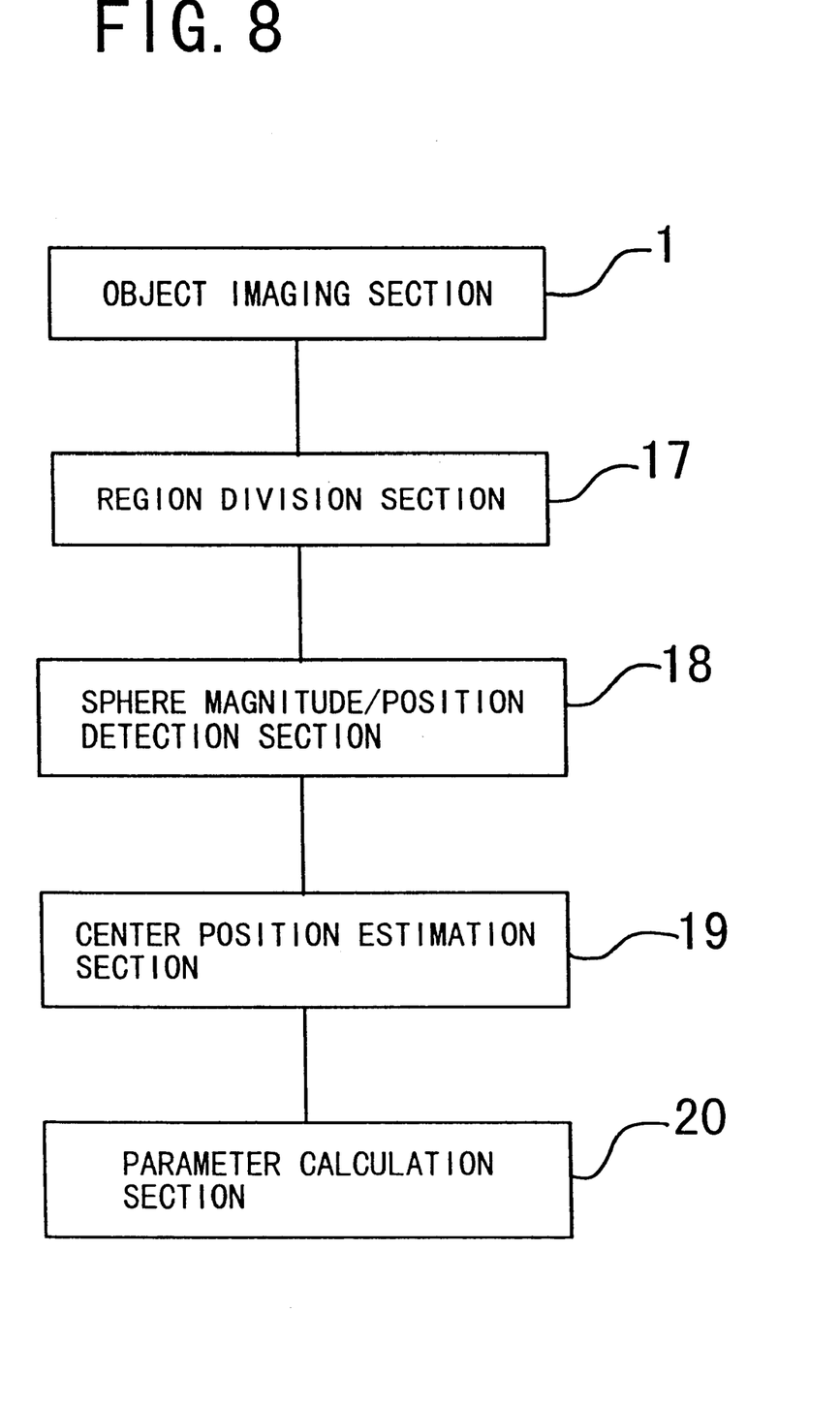
FIG. 8 is a block diagram showing a construction of a yet further camera calibration apparatus to which the present invention is applied.
Figure 9:
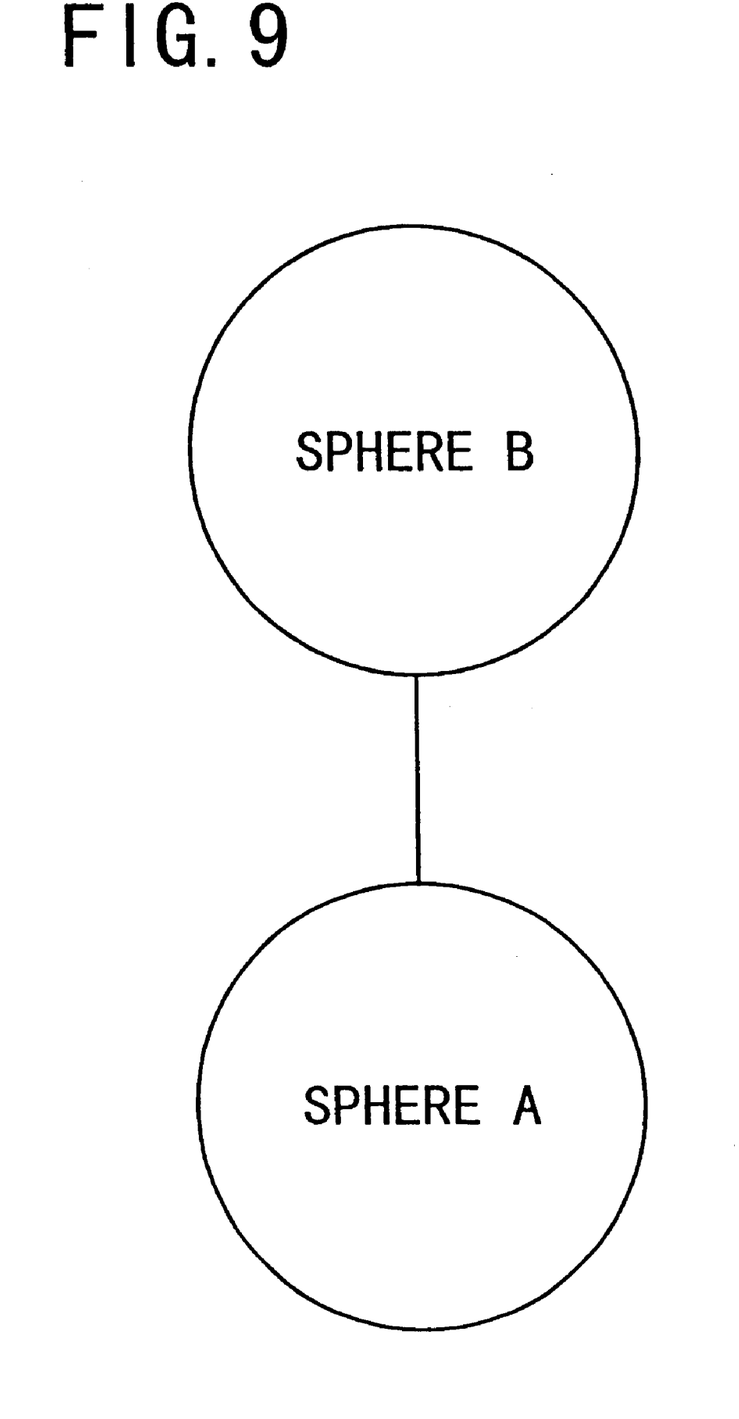
FIG. 9 is a diagrammatic view showing connected spheres used in the camera calibration apparatus shown in FIG. 8.

FIG. 8 shows in block diagram a construction of a yet further camera calibration apparatus to which the present invention is applied, and FIG. 9 shows connected spheres used in the camera calibration apparatus of FIG. 8. Referring to FIGS. 8 and 9, the camera calibration apparatus includes an object imaging section 1 similar to that described hereinabove with reference to FIG. 1 and further includes a region division section 17, a magnitude/position detection section 18, a center position estimation section 19 and a parameter calculation section 20.

In the camera calibration apparatus shown in FIG. 8, the object imaging section 1 images an object like iron dumbbells composed of a plurality of spheres connected to each other (refer to FIG. 9). It is assumed here that the positions of the centers and the radii of the spheres A and B, which compose the object like dumbbells, in a world coordinate system a are known.

It is also assumed that the spheres A and B imaged by the object imaging section 1 do not overlap with each other on the camera screen 6a and the connection portion between the spheres is colored in a same color as that of the background or a like countermeasure is taken so that it may not be detected as part of any of the spheres.

The region division section 17 performs region division so that images of the plurality of spheres A and B on the camera screen 6a may be distinguished from each other. The method of the region division may be such that, for example, if the background color is black and the spheres A and B are white, then a pixel of white is searched first, and then those pixels around the white pixel which are white similarly should be determined that they belong the same region.

After the regions of the spheres A and B are divided successfully, processing of the magnitude/position detection section 18 and the center position estimation section 19 is performed for each of the regions in a similar manner as in the camera calibration apparatus described hereinabove with reference to FIG. 1 to estimate the positions of the centers of the spheres A and B.

In the case of the example shown in FIG. 9 in which two spheres are involved, where the position of the center of the sphere A in the world coordinate system a is represented by $(X_0, Y_0, Z_0)$ and the position of the center of the sphere B is represented by $(X_1, Y_1, Z_1)$, camera parameters can be estimated by processing by the parameter calculation section 20 which is similar to the processing described hereinabove in connection with the camera calibration apparatus of FIGS. 1 and 5 to 7. Further, if three or more spheres are involved, also a component of rotation around the Y axis which is not determined in the camera calibration apparatus described hereinabove can be determined.

In this manner, by using a sphere as an imaging object to be imaged by the object imaging section 1 and using an image of the imaging object itself imaged by the object imaging section 1 for calibration, the number of characteristic points of the imaging object can be reduced, and since a similar result can be obtained whichever ones of characteristic points at the zenith and on the equator are used, stabilized characteristic point extraction processing which does not rely upon imaging conditions can be performed.

Further, also where the zenith of the sphere 5 is used, only one characteristic point is used. Furthermore, even where the equator of the sphere 5 is utilized, there is no need of performing mapping of a plurality of characteristic points distinguishing them from each other, and consequently, even if the number of characteristic points is increased, the mapping processing is not complicated.

While preferred embodiments of the present invention have been described using specific terms, such description is for illustrative purposes only, and it is to be understood that changes and variations may be made without departing from the spirit or scope of the following claims.

What is claimed is:

1. A method for calibrating a camera, comprising:

imaging a sphere whose magnitude and position in a three-dimensional coordinate system are known, said imaging step being performed by an object imaging device;

determining a magnitude and a position of the sphere on a screen based on a image derived in said imaging step;

estimating a three-dimensional position of a center of the sphere from the magnitude and the position of the sphere on the screen determined in said determining step;

calculating a position of said object imaging device in the three-dimensional coordinate system based on the three-dimensional position of the center of the sphere estimated in said estimating step.

2. The method of claim 1, wherein the sphere has a characteristic point at a zenith and/or the equator thereof.

3. The method of claim 1, further comprising:

determining a position of a zenith of the sphere on the screen from the image imaged by said object imaging device;

estimating a three-dimensional position of the zenith from the position of the zenith on the screen and the three-dimensional position of the center of the sphere; and calculating a direction of said object imaging device in the three-dimensional coordinate system based on the three-dimensional position of the estimated zenith and the estimated three-dimensional position of the center of the sphere.

4. The method of claim 1, further comprising:

determining a position of a characteristic point on the equator of the sphere on the screen from the image imaged by said object imaging device;

determining, from the position of the characteristic point on the equator and the three-dimensional position of the center of the sphere, a line segment orthogonal to a straight line interconnecting the characteristic point on the equator and the center of the sphere;

calculating a direction of said object imaging device in the three-dimensional coordinate system based on the three-dimensional position of the zenith estimated based on the determined line segment and the estimated three-dimensional position of the center of the sphere.

5. The method of claim 1, further comprising:

determining positions of a plurality of characteristic points on the equator of the sphere on the screen from the image imaged by said object imaging device;

determining an equator plane of the equator from the positions of the plurality of characteristic points on the equator and the three-dimensional position of the center of the sphere; and calculating a direction of said object imaging device in the three-dimensional coordinate system based on the three-dimensional position of the zenith estimated based on the equator plane and the estimated three-dimensional position of the center of the sphere.

6. A method for calibrating a camera, comprising:

imaging, using an object imaging device, a plurality of spheres whose magnitudes and positions in a three-dimensional coordinate system are known;

determining magnitudes and positions of the plurality of spheres on a screen from an image imaged by said object imaging device;

estimating three-dimensional positions of the centers of the plurality of spheres from the determined magnitudes and the positions of the plurality of spheres on the screen; and calculating a position and a direction of said object imaging device in the three-dimensional coordinate system based on the estimated three-dimensional positions of the centers of the plurality of spheres.

* * * * *